(No Model.)

H. G. WILLIAMS.
AIR COMPRESSOR.

No. 556,119. Patented Mar. 10, 1896.

Witnesses

Inventor
Horace G. Williams
By Attorney Herbert W. T. Jenner.

UNITED STATES PATENT OFFICE.

HORACE G. WILLIAMS, OF PHILADELPHIA, PENNSYLVANIA.

AIR-COMPRESSOR.

SPECIFICATION forming part of Letters Patent No. 556,119, dated March 10, 1896.

Application filed April 6, 1895. Serial No. 544,783. (No model.)

*To all whom it may concern:*

Be it known that I, HORACE G. WILLIAMS, a citizen of the United States, residing at Philadelphia, in the county of Philadelphia and State of Pennsylvania, have invented certain new and useful Improvements in Air-Compressors; and I do hereby declare the following to be a full, clear, and exact description of the invention, such as will enable others skilled in the art to which it appertains to make and use the same.

This invention relates to air-compressors; and it consists in the novel construction and combination of the parts hereinafter fully described and claimed.

Figure 1:
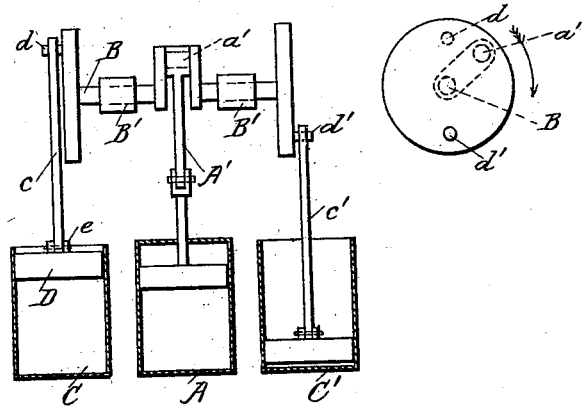
Figure 2:
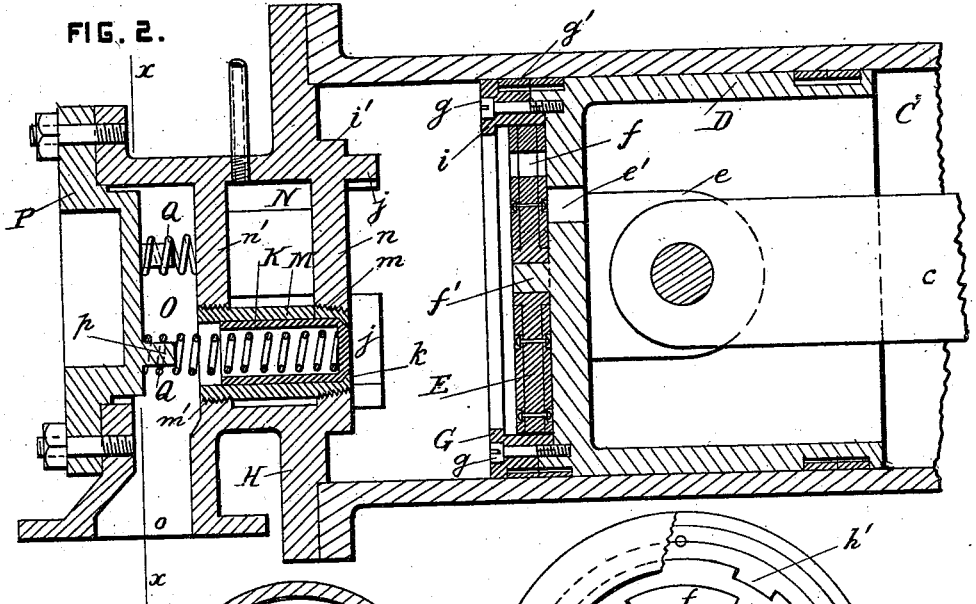
Figures 3, 4:
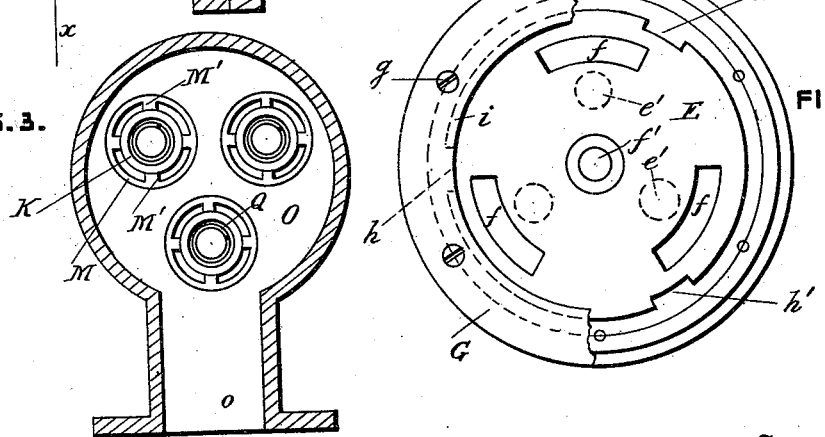

In the drawings, Figure 1 is a diagram showing the connection of the compressing-cylinders with the steam-cylinder. Fig. 2 is a longitudinal section through the end portion of one of the compressing-cylinders, showing the piston and the inlet and outlet valves. Fig. 3 is a cross-section taken on the line $xx$ in Fig. 2. Fig. 4 is an end view of the piston with a portion of the keeper-ring removed.

A is a double-acting steam-cylinder, which is of ordinary approved construction. This cylinder is operatively connected to the crank $a'$ of the crank-shaft B by the connecting-rod A'. B' are the bearings which support the crank-shaft.

C C' are two similar single-acting air-compressing cylinders preferably arranged one on each side of the steam-cylinder. The cylinder C is operatively connected to the crank $d$ on the crank-shaft B by the connecting-rod $c$, and the cylinder C' is connected in a similar manner to the crank $d'$ by the connecting-rod $c'$. The crank $d$ is arranged on the opposite side of the shaft B from the crank $d'$, and the crank $a'$ is arranged a short distance in advance of the crank $d$, the distance being arranged according to the position of the cut-off in the steam-cylinder, so that the steam shall exert its greatest power on the piston and crank-pin of the steam-cylinder at the points at which the greatest power is required in the air-compressing cylinders—namely, at the ends of the strokes of the air-compressing pistons.

D is the piston of the air-compressing cylinder C, both of the cylinders C C' and the parts co-operating with them being exactly alike. The piston D is provided with lugs $e$ for the attachment of the connecting-rod and air-inlet holes $e'$. E is the air-inlet valve, which consists of a plate of metal faced upon each side with soft material, such as a composition of asbestos and india-rubber. The valve E is provided with air-holes $f$ arranged out of line with the air-inlet holes $e'$, and it slides upon the central pin $f'$, which projects from the end of the piston.

G is the keeper-ring secured to the end of the piston by bolts $g$. This ring performs the double function of keeping the front packing-rings $g'$ in place and of guiding the valve E and regulating its lift. The packing-rings $g'$ are of any approved construction. The keeper-ring G is provided with guide-lugs $h$ on its periphery, which engage with notches $h'$ in the valve and prevent it from revolving. The keeper-ring is also provided with a projecting flange $i$ for the valve to strike against when it lifts off its seat upon the end of the piston.

H is the end cover of the cylinder, secured to it any approved manner. This cover has a circular projection $i'$ on it which enters the space between the end of the keeper-ring and the valve when the piston is at the rear end of its stroke, and it has also projections $j$ which enter the air-holes $f$ of the valve. In this manner the clearance at the end of the cylinder is reduced to as little as possible, and it consists of little more than the small annular space under the flange $i$ of the keeper-ring.

The cover H is preferably provided with three outlet-valves K; but more or less than three may be used. These valves K are all alike.

M is a tubular bush having a tapered screw-thread $m$ at its front end and a parallel screw-thread $m'$ at its rear end. This bush is screwed into the plates $n$ and $n'$ of the cover, and N is a space formed between the said plates and around the bush or bushes. Water or other cooling material is circulated through the space N in any approved manner.

The valve-seat $k$ is formed at the bottom of the bush M. The valve K is cylindrical and hollow and slides against the inwardly-projecting guides M' of the bush.

O is the air-chamber behind the plate $n$, and $o$ is the air-outlet.

P is a cover secured over the air-chamber and permitting free access to the valves and their bushes when removed.

Q is a spring interposed between the valve and the cover P. One end of the spring is in the hollow valve, and its other end is guided by the projection $p$ on the cover P.

The valves can be removed and the bushes taken out and the valves and their seats reground together as often as necessary.

What I claim is—

1. In an air-compressor, the combination, with a piston provided with air-holes, and a keeper-ring secured to the end of the piston and provided with a projecting flange $i$ and guide-lugs $h$; of the packing-rings engaging with grooves in the said piston and ring and held in position by the said ring, and an air-inlet valve provided with air-holes arranged out of line with the aforesaid air-holes, and notches engaging with the said guide-lugs, the said valve being slidable between the end of the piston and the said flange, substantially as set forth.

2. In an air-compressor, the combination, with a piston provided with air-holes, a keeper-ring provided with a projecting flange $i$ and guide-lugs $h$, and an air-inlet valve provided with air-holes arranged out of line with the aforesaid holes and slidable on the said lugs between the end of the piston and the said flange; of a cylinder-cover provided with a circular projection $i'$ for entering the space between the end of the keeper-ring and the valve, and projections $j$ projecting from the projection $i'$ and entering the holes of the valve, substantially as set forth.

In testimony whereof I affix my signature in presence of two witnesses.

HORACE G. WILLIAMS.

Witnesses:
  HERBERT W. T. JENNER,
  E. A. PAUL.